June 20, 1950 F. H. SCHNEIDER 2,512,287
BROILER
Original Filed Oct. 27, 1944 3 Sheets-Sheet 3
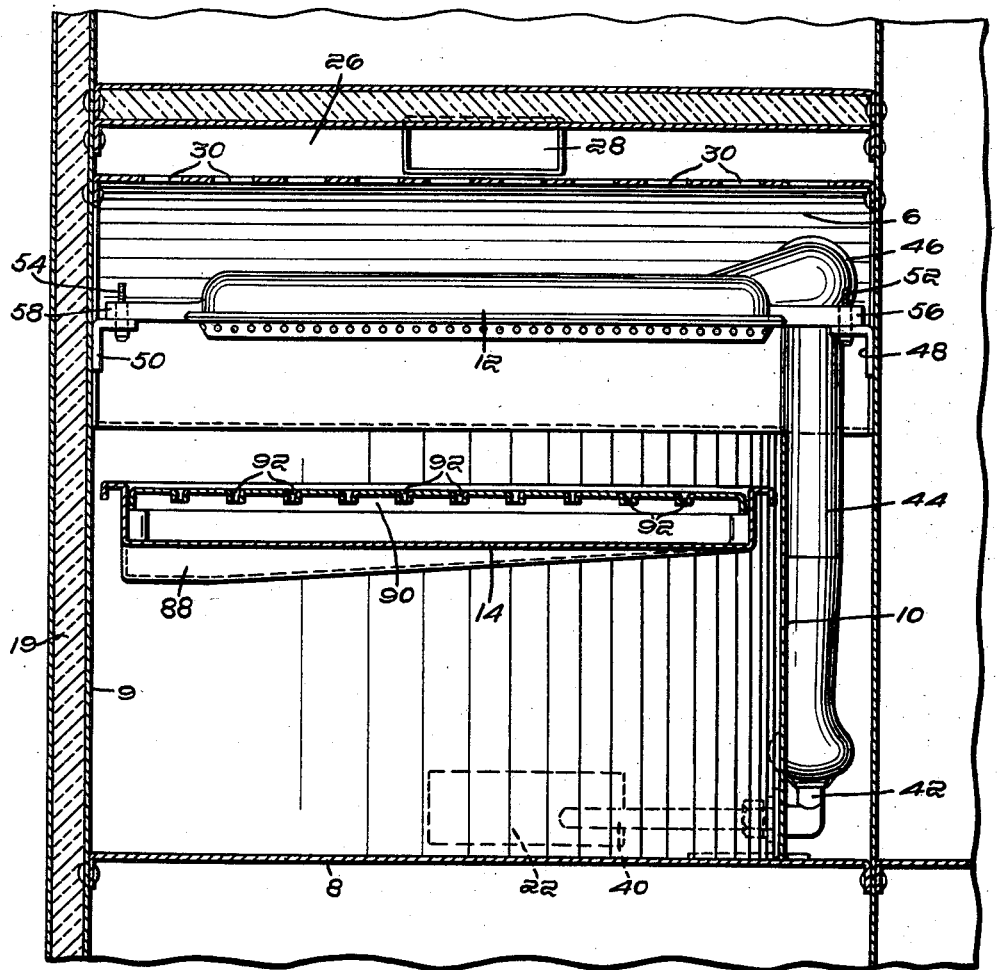
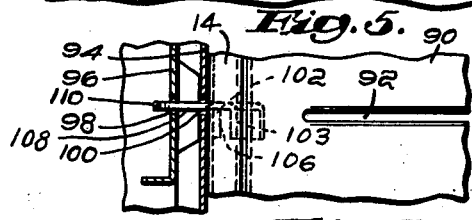
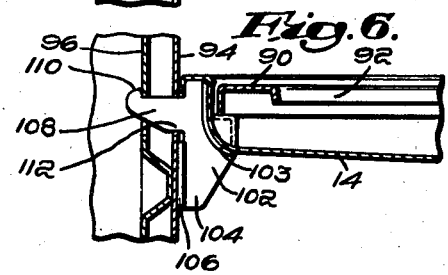
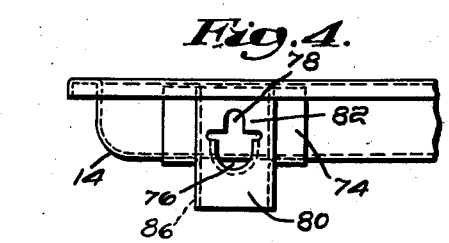
Inventor:
Frank H. Schneider
by Chudley Chittick
Attorney Patented June 20, 1950

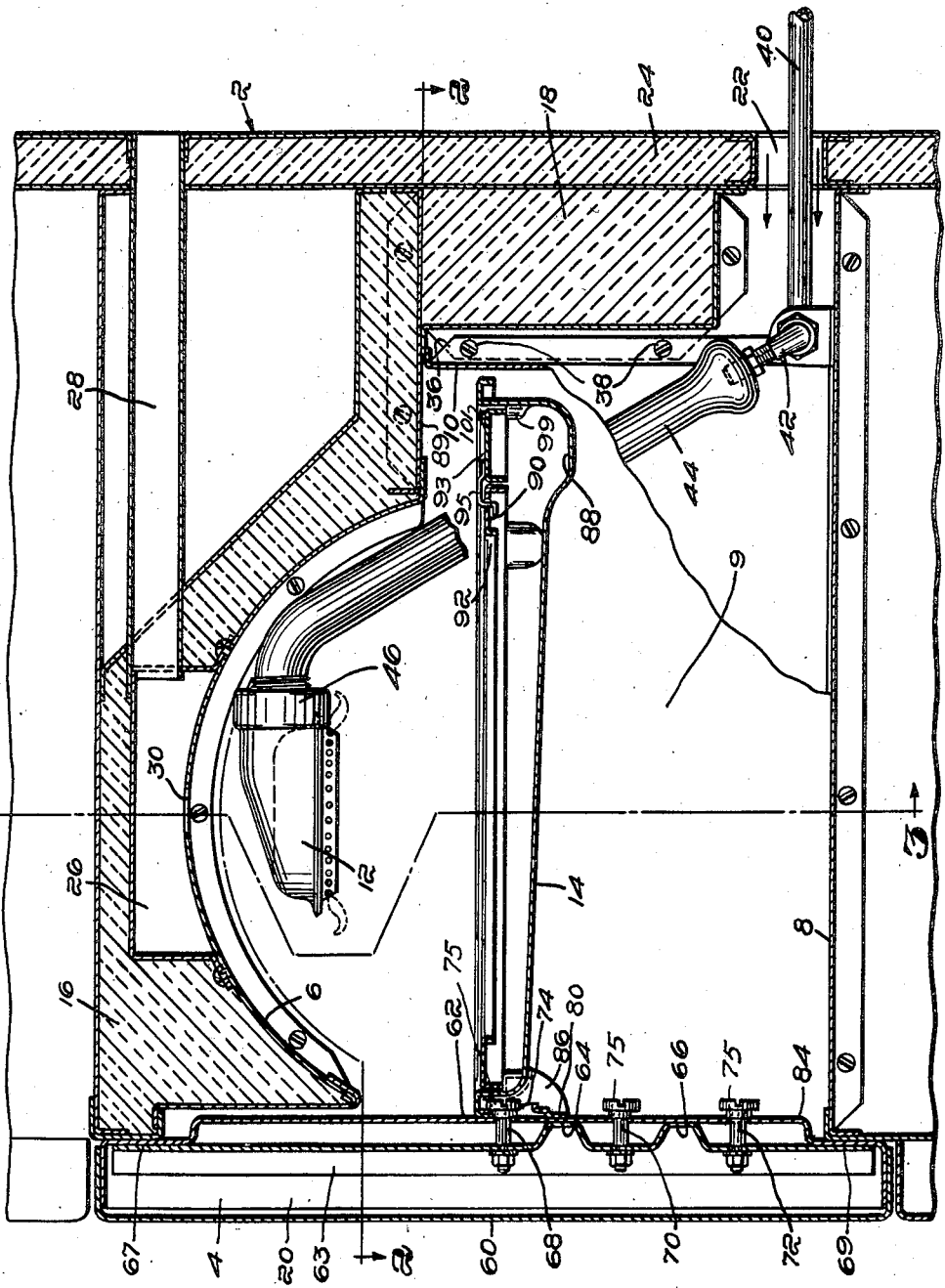

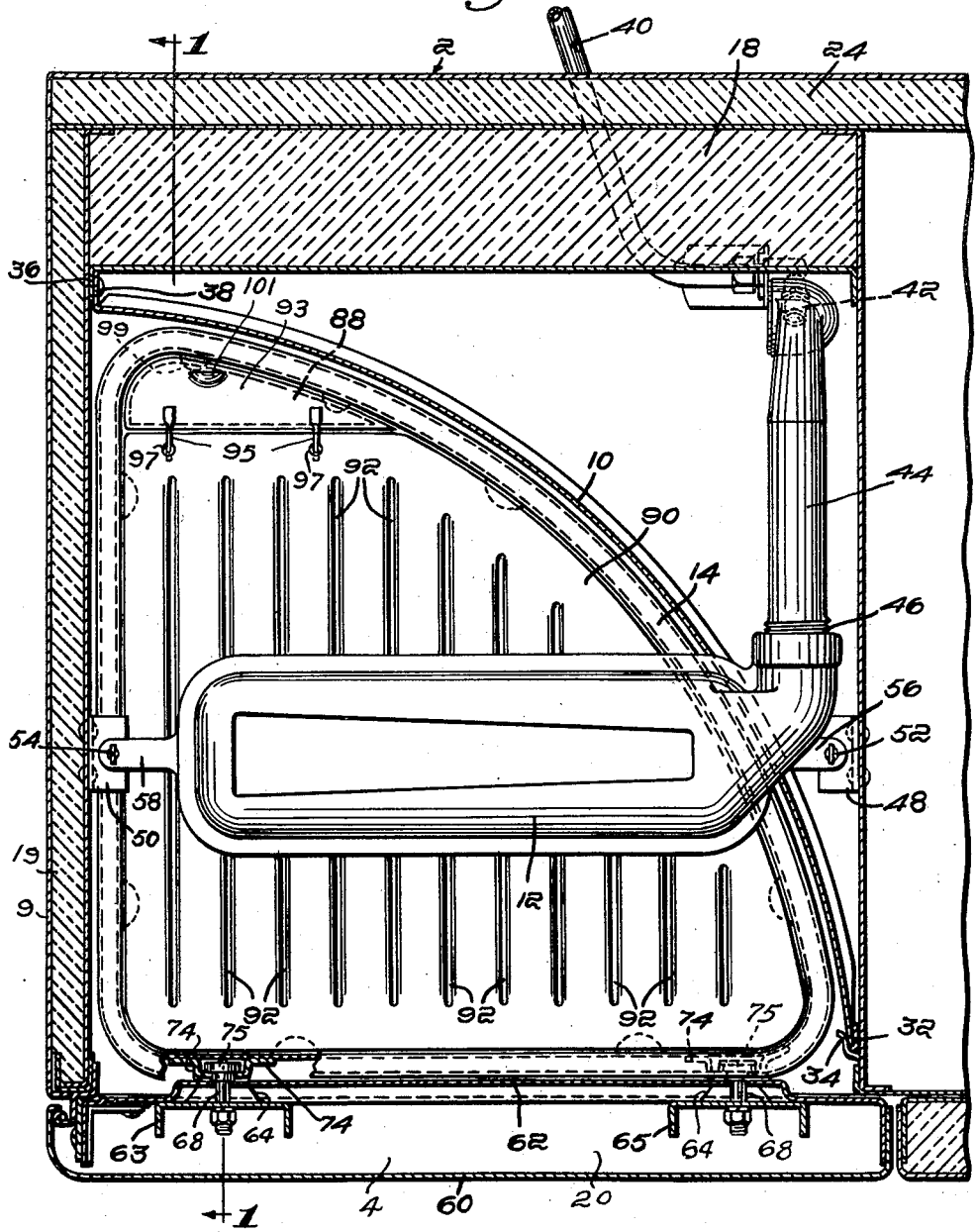

2,512,287

UNITED STATES PATENT OFFICE 2,512,287

BROILER

Frank H. Schneider, Gardner, Mass., assignor to Florence Stove Company, Gardner, Mass., a corporation of Massachusetts Original application October 27, 1944, Serial No. 560,678, now Patent No. 2,430,848, dated November 11, 1947. Divided and this application June 19, 1947, Serial No. 755,815

5 Claims. (Cl. 99—425)

This application is a division of the application of Frank H. Schneider, Serial No. 560,678, filed October 27, 1944, for Broiler and since issued on November 11, 1947, as Patent No. 2,430,848.

This invention relates to broilers, and is particularly concerned with the provision of a broiling pan which is attached to or hung from the oven door, so that upon opening the door the pan and any food that may be positioned thereon may be swung outwardly for inspection or removal.

The present construction may be used in any conventional type of broiler, as well as with a broiler of the arched roof type shown in the drawings.

Another object of the invention is the provision of means for adjustably locating the broiling pan at varying distances from the burner, so that the broiling temperatures may be controlled to provide for different types of cooking.

Another feature of the invention includes the provision of a removable wall in the broiler which follows generally the contour of the hanging broiler pan.

The invention also contemplates means for holding the door in open position, so that the food may be conveniently placed on or removed from the pan, and so that the vertical position of the pan may be shifted without the user being troubled by any tendency of the door to swing shut. These and other features of the invention will become more apparent as the description proceeds with the aid of the accompanying drawings, in which Fig. 1 is a vertical section of the broiler on the line 1—1 of Fig. 2 and including the burner in full side elevation.

Fig. 2 is a horizontal section on the line 2—2 of Fig. 1.

Fig. 3 is a vertical section on the line 3—3 of Fig. 1.

Fig. 4 is a fragmentary side elevation of one corner of the pan, showing the pan connecting means which is utilized in Figs. 1 and 2.

Fig. 5 is a horizontal fragmentary section showing an alternative pan connecting means.

Fig. 6 is a vertical section of the connecting means shown in Fig. 5.

Referring to Fig. 1, the invention comprises a broiler, generally referred to by the numeral 2, having a door 4. The broiler structure proper consists of an arched roof 6, a bottom or floor 8, a side wall 9, and a rear curved vertical wall 10. A burner 12 is located in the arched area and extends across a major portion of the width of the oven.

Hung from the door is a broiler pan 14, which may be located at any of the several positions provided on the interior wall of the door, or if desired it may be placed directly on the floor of the broiler.

The broiler is preferably surrounded by insulating material, the roof being covered by the material 16, the rear wall surrounded by the material 18, the side wall 9 covered by material 19, and the door may be filled with material at 20. It is not customary to insulate the area under the floor, but this may be done if desired.

The air that provides oxygen for combustion enters the broiler through a port 22 at the lower part of the outer rear wall 24 of the broiler housing. The products of combustion are permitted to escape through the transversely extending vent 26, which is connected to the chimney by the exhaust port 28. The arched portion of the roof 6 immediately below vent 26 has a plurality of apertures 30 through which the exhaust gases may pass on their way to exhaust port 28.

Referring more particularly to the details of the broiler construction, it will be seen that the arched roof 6, preferably formed of sheet metal, extends the entire width of the oven and the curvature is sufficient to substantially surround the burner 12. The arched formation results in causing more heat to be directed against pan 14, as not only does the heat from burner 12 pass directly to the pan 14, but a very substantial additional amount is reflected downwardly from the arched roof to the pan surface.

The arrangement of the parts is such that the heat transmitted to the pan regardless of the pan's location is far greater and more uniform than would be the case were the broiler roof of conventional construction.

In Fig. 2 the curved vertical back wall 10 is plainly shown. This wall has been made removable, so that it may be easily cleaned. Removal is accomplished by pressing backwardly against the middle of wall 10, so that the front edge 32 of the wall is moved a sufficient distance to the rear to clear the retaining lip 34. The edge 32 can then be sprung past lip 34 to be drawn forwardly out of the oven. In so doing, the rear flange 36 of wall 10 will be drawn free of the studs 38 which normally hold the rear wall 10 in position.

While wall 10 provides means for blocking off the rear corner of the oven, which is not occupied by the broiler pan, still it is not essential as far as the cooking characteristics of the broiler are concerned. If desired, the wall 10 may be omitted without changing the efficiency of the broiler. Extending horizontally rearwardly from the back edge of the arched roof 6 is a secondary roof 89 which intersects at right angles with wall 10, as shown in Figs. 1 and 3.

The burner 12 is of conventional construction, as far as the burner itself is concerned, but the entire burner unit is formed in such a way that it may be easily withdrawn from the oven. The gas is supplied through pipe 40 and nipple 42, whence it passes into the neck 44 which extends upwardly and forwardly along the right side of the oven, passing over wall 10 to a position just under the arched roof to connect with the right hand end of the burner at 46.

The burner may be supported in the broiler in any convenient manner. One such means is shown in Figs. 2 and 3 and consists of angle brackets 48 and 50, which carry vertical studs 52 and 54. The burner is suspended from lugs 56 and 58, both of which contain suitably located holes to receive studs 52 and 54. Thus the burner when supported by brackets 48 and 50 is adequately maintained against accidental dislodgement. When it is desired to remove the burner from the broiler, it is merely raised enough to clear studs 52 and 54 and then drawn forwardly and downwardly, at which time neck 44 slides off nipple 42 and over wall 10. In this way the burner may be easily removed for cleaning.

The adjustable pan construction is so arranged that the pan is wholly supported by the door alone. The door is sufficiently rigid and the pan likewise is strong enough to act as a cantilever capable of supporting such weight as would normally be placed thereon.

The pan supporting structure is shown in Figs. 1, 2 and 4. The door structure which carries the pan 14 is shown in Figs. 1 and 2. The door has an outer surface 60 and an inner surface 62. Intermediate of these two surfaces and extending vertically at either side, are two shallow channel irons 63 and 65, as in Fig. 2, which are secured against the inner surface 62 at the top and bottom as at 67 and 69 in Fig. 1. At certain places throughout their lengths, as at 64 and 66 in Fig. 1, the channels have raised areas which engage the inside surface 62. These points of engagement are positioned where pressure from the pan is exerted, so as to give the necessary support. Two vertically aligned series of bolts 68, 70 and 72 pass through channels 63 and 65 and the inner surface 62. These two vertical rows of bolts are seen in Fig. 2, one to the right and one to the left. Suitable shoulders on the shanks of the bolts maintain the heads of the bolts a short distance inwardly of the surface 62, so that the pan may be locked on the bolts with the pan engaging portion behind the heads.

The particular pan connecting means is shown in detail in Fig. 4. The pan 14 has spot-welded or otherwise fixed thereto two connectors 74 of heavy sheet metal or other suitable material. The connectors 74 are in the form of shallow channels with lateral flanges, as seen in Fig. 2. The central portions are cut away at 76, forming holes of sufficient area to receive the heads 75 of bolts 68, 70 and 72. The upper portion of the cut away area 76 terminates in a more restricted zone 78, which is large enough to pass over the bolt shoulders but small enough to trap the bolt heads 75 behind the side portions 82.

The two connectors 74, one at each side of the pan, are accurately spaced so that when the pan is placed against the door, the bolt heads will pass through the holes 76, permitting the back surface 80 of the connector to rest against surface 62. The pan can then be lowered horizontally so that the back surface 80 slides downwardly along the surface 62 until the bolt heads are locked behind the side portions 82 of the restricted areas 78.

The lower part of back surface 80 rests against the surface 62 at the supported position 64 when the pan is at its highest location or against supported position 66 at the intermediate location, or against the supported area 84 at the lowermost position. The web 86, see Fig. 1, of connector 74 provides sufficient strength to prevent any appreciable downward bending of the pan when locked to the door. Thus it will be seen that the pan may readily be located on the door at a position to provide desired cooking conditions.

The pan itself is shaped as shown in the plan view in Fig. 2, having the left edge close to the left wall 9, while the front edge is against the back of the door and the curved edge is close to wall 10. The bottom of the pan is shallow at the front and slopes to the rear, terminating in a depressed area or well at 88, into which fats or gravy may drain. The well 88 is located at the rearmost portion of the broiler pan where it is most remote from the burner and regardless of the vertical position of the pan, well 88 will be located below the secondary roof 89 and protected to a substantial degree from the heat reflected by the arched roof 6. The door serves the purpose of uniformly returning the well 88 to the same position under the secondary roof.

Supported by indented portions of the pan wall is a food supporting rack 90, which may be formed of pressed sheet metal having a series of longitudinal slots 92 through which the fats from the food may drain. This rack is removable from the pan for easy cleaning.

The well 88 is covered by a small hinged cover 93. The hinged connection between this cover and the rack 90 may be in any convenient form and as shown consists of a pair of wire members 95 secured to the top of cover 93 which pass over the edge of rack 90 and downwardly through holes 97. The rear edge of cover 93 is supported by the indented portion 99 of the pan 14. To facilitate lifting the cover a small section of the cover has been bent upwardly as at 101 to provide a member which may be gripped by the finger or a fork or spoon. Cover 93 further assists in maintaining the fat in well 88 at a lower temperature.

It will be noted that the bottom of the connector 74 terminates at a point which is on the same level with the bottom of the fat collecting well 88. Thus, when the pan is removed from the door and is placed on the stove bottom or on a table, it will be maintained level because of the equal length of the three supporting legs.

A modified form of construction of means for connecting the pan to the door is shown in Figs. 5 and 6. Here the inner surface of the door is numbered 94 and the vertical channel 96. Vertical aligned slots 98 and 100 extend through the surface 94 and channel 96, and through these the connectors may be passed. Each connector consists of a unit 102 which may be welded or bolted to the edge of the pan 14 by the flange 103. The downwardly extending web portion 104 has a flange 106 adapted to press against surface 94 at the area supported by the raised portions of channel 96. Lug 108, with an upwardly turned hook 110, extends away from pan 14. The lug 108 may be passed through the slots 98 and 100 in a downwardly direction in order to enable hook 110 to engage behind the upper end of slot 98. When the hook 110 has passed beyond the inside of channel 96, the pan may then be lowered to horizontal position, and the hook 110 will swing upwardly to engage behind channel 96, thus locking the pan in position. Downward movement of the pan is prevented by the engagement of bottom of slot 100 with lug 108 at the point 112. Thus hook 110 cannot become disconnected without lifting the rear end of the pan above the horizontal.

While a preferred form of the invention has been shown and described, it will be understood that the invention is not to be limited thereby, but only by the appended claims.

I claim:

1. In combination, a door for a broiler and a pan supported as a cantilever solely by said door, said door having inner and outer walls and reinforcing members between said walls supporting said inner wall against deflection toward said outer wall, means for removably connecting said pan to said door in a horizontal position, said pan having a well at a location remote from said door, two spaced members connected to said pan and extending therebelow to positions against said inner wall where said inner wall is reinforced, said members acting to assist in maintaining said pan in horizontal position, the lower ends of said members and the bottom of said well being in substantially the same horizontal plane to act as means for supporting said pan in a horizontal position when said pan has been disconnected from said door and placed on a horizontal surface.

2. In combination, a door for a broiler and a pan carried thereby as a cantilever, said door having spaced inner and outer walls, means for removably connecting said pan to said door comprising cooperating parts on said door and said pan which, when engaged, will resist downward turning movement of said pan, whereby said pan may be maintained substantially level, one of said parts being a short leg having its lowermost point substantially at the same level as the lowermost part of said pan, said short leg pressing normally against the inner surface of said door, and reinforcing members extending across the space between said inner and outer walls and connected to the said inner wall, each of said reinforcing members spaced from said inner wall over most of its length, each of said reinforcing members having a portion extending laterally toward said inner wall sufficiently to engage directly against said inner wall at a location opposite the area of engagement of said short leg against said inner wall.

3. The combination set forth in claim 2 with one of said cooperating parts extending through said inner wall and said reinforcing member at a point where said wall and said member are spaced apart.

4. The combination set forth in claim 2 with said reinforcing members being in the form of vertically extending channels and having said laterally extending portions positioned below one cooperating part on the door and above another similar cooperating part on the door at the next lower pan supporting position.

5. In combination, a door for a broiler and a pan supported as a cantilever solely by said door, said door having inner and outer walls with reinforcing members between said walls for supporting said inner wall against deflection toward the outer wall, said members being located at at least two laterally spaced positions, means for removably connecting said pan to said door in a horizontal position comprising laterally spaced cooperating parts on said door and pan, at least two laterally spaced legs connected to said pan with their lower ends extending below said parts, said legs being in engagement with the said inner wall at the said reinforced positions to assist in supporting said pan in horizontal position with respect to said door, said pan having a well at a location remote to said door, the lower ends of said legs and the bottom of said well being in substantially the same horizontal plane to act as means for supporting said pan in a horizontal position when said pan has been disconnected from said door and placed on a horizontal surface.

FRANK H. SCHNEIDER.

REFERENCES CITED

The following references are of record in the file of this patent:

UNITED STATES PATENTS

| Number | Name | Date |
|---|---|---|
| 435,877 | Yawman | Sept. 2, 1890 |
| 872,353 | Konst | Dec. 3, 1907 |
| 1,070,118 | Cornyn | Aug. 12, 1913 |
| 1,462,670 | Vance | July 24, 1923 |
| 1,625,412 | French | Apr. 19, 1927 |
| 1,743,837 | Vance | Jan. 14, 1930 |
| 1,826,055 | Cornwall | Oct. 6, 1931 |
| 2,012,520 | Rogers | Aug. 27, 1935 |
| 2,027,124 | Stockstrom et al. | Jan. 7, 1936 |
| 2,411,993 | Hobson | Dec. 3, 1946 |
| 2,430,848 | Schneider | Nov. 11, 1947 |